United States Patent [19]
Davis

[11] Patent Number: 6,103,804
[45] Date of Patent: Aug. 15, 2000

[54] PROCESS FOR THE SEALING COMPONENTS EXPOSED TO AGGRESSIVE FUNCTIONAL FLUIDS AND RTV SILICONE COMPOSITIONS SUITABLE FOR USE THEREIN

[75] Inventor: Timothy D. Davis, Toledo, Ohio

[73] Assignee: Wacker Silicones Corporation, Adrian, Mich.

[21] Appl. No.: 09/167,268

[22] Filed: Oct. 7, 1998

[51] Int. Cl.⁷ ........................................ C08J 3/20
[52] U.S. Cl. .................. 524/431; 524/433; 524/779; 524/785; 156/329
[58] Field of Search ..................... 524/431, 433, 524/785, 779; 156/329

[56] References Cited

U.S. PATENT DOCUMENTS

| | | |
|---|---|---|
| 4,170,700 | 10/1979 | Sweet . |
| 4,728,687 | 3/1988 | Watanabe et al. . |
| 4,748,166 | 5/1988 | Gautier et al. . |
| 4,769,412 | 9/1988 | Inoue et al. .............................. 524/431 |
| 4,782,107 | 11/1988 | Lagarde . |
| 4,822,830 | 4/1989 | Adkins ..................................... 523/203 |
| 4,892,907 | 1/1990 | Lampe et al. . |
| 4,962,151 | 10/1990 | Mellon . |
| 5,013,781 | 5/1991 | Koshii et al. . |
| 5,118,738 | 6/1992 | Berthet et al. . |
| 5,247,011 | 9/1993 | Tsuji et al. . |
| 5,266,631 | 11/1993 | Arai et al. . |
| 5,268,441 | 12/1993 | Barthel et al. . |
| 5,550,185 | 8/1996 | Inoue et al. . |
| 5,569,750 | 10/1996 | Knepper et al. . |
| 5,641,827 | 6/1997 | Chang et al. ........................... 524/431 |

*Primary Examiner*—Margaret G. Moore
*Attorney, Agent, or Firm*—Brooks & Kushman P.C.

[57] ABSTRACT

RTV-1 silicone sealants resistant to deterioration in the presence of aggressive functional fluids are prepared from an organopolysiloxane component comprising a major amount of silanol-functional organopolysiloxane, a primary or secondary amine-functional crosslinker, and both iron oxide and magnesium oxide, optionally together with auxiliary fillers, adhesion promoters, catalysts, and customary additives. The gasket materials are particularly useful in axle and transaxle seals exposed to fuel efficiency-promoting aggressive lubricants.

25 Claims, 2 Drawing Sheets

PROCESS FOR THE SEALING COMPONENTS EXPOSED TO AGGRESSIVE FUNCTIONAL FLUIDS AND RTV SILICONE COMPOSITIONS SUITABLE FOR USE THEREIN

TECHNOLOGICAL FIELD

The present invention pertains to amine cured, one-component, room temperature vulcanizable ("RTV-1") polyorganosiloxane-based sealants exhibiting resistance to aggressive functional fluids, and their use in sealing components containing such fluids.

BACKGROUND OF THE INVENTION

Silicone elastomers have been employed in sealing applications for many years. For O-rings and other molded seals, high temperature vulcanizable (HTV) compositions are generally used. Such compositions are somewhat less expensive than RTV-2 compositions, and also exhibit somewhat greater thermal stability. These compositions may include polydimethylorganosiloxanes, fillers, and organic peroxides which function to cure the compositions by free radical-induced crosslinking. Pour-in-place and similar gaskets often cannot employ HTV compositions, however, as the parts being sealed, the fluids sealed within them, or both, cannot stand the elevated temperatures required for curing. Examples of HTV elastomers and their components may be found in U.S. Pat. Nos. 4,782,107; 4,728,687; and 5,550,185.

Two-component room temperature vulcanizable compositions ("RTV-2") have been used as elastomeric sealants. Such compositions generally contain unsaturated alkenyl-functional organopolysiloxanes such as those containing vinyl, allyl, acryloxy, methacryloxy, or ω-terminal alkenyl radicals such as ω-hexenyl radicals, in conjunction with an Si—H functional organopolysiloxane. One or both components also contain a hydrosilylation catalyst. Use of fillers such as fumed silica, quartz flour, calcium carbonate and the like is relatively common. However, such elastomers do not, in general, have the thermal stability of HTV elastomers, and are inconvenient to use because of their two-part formulation. RTV-2 compositions employing other reactive systems are known as well, for example those disclosed in U.S. Pat. No. 4,892,907.

Single component, room temperature vulcanizable ("RTV-1") silicone sealants have been known in the construction trade for many years. Such sealants often include acyloxy-functional silicones as one component of a storage-stable blend which also generally includes a silanol-functional silicone such as an $\alpha,\omega$-dihydroxypolydimethylsiloxane. The composition begins to cure upon exposure to atmospheric moisture. To increase the viscosity and the "body" of the cured elastomer, large amounts of relatively inexpensive fillers such as ground calcium carbonate are incorporated in the sealant composition. Such sealants generally cure relatively slowly and first form a cured skin which impedes ingress of moisture necessary to cure the interior. While useful as caulks in the construction industry, such sealants have little use as sealants for other applications. Moreover, such sealants do not possess exceptional thermal stability, exhibiting more severe degradation than other silicone elastomers at elevated temperatures.

In environments where gasketing material must be cast or poured in place, the ability to use HTV silicone elastomers, as previously indicated, is severely limited. Moreover, such gaskets are often used to seal off cavities or passages which contain fluids, particularly in the automotive sector where gasketing materials may be exposed to water, antifreeze, gasoline, brake fluids, hot and cold oil, automatic transmission fluid, and gear and axle lubricants and fluids. In U.S. Pat. No. 5,013,781, for example, are disclosed RTV-1 compositions containing organopolysiloxane resins composed of M and Q units or of M, D, and Q units, together with an inorganic filler, an alkoxysilane adhesion promoter, and a ketoxime silicone crosslinker. The fillers used may be non-reinforcing or reinforcing silica filers, or may be non-reinforcing, non-silaceous fillers such as calcium carbonate, zinc carbonate, magnesium oxide, aluminum hydroxide, iron oxide, zinc oxide, titanium oxide, and powdered mica. The fillers were viewed as substantially equivalent, with the highest initial properties and greatest retention of properties exhibited by fumed silica and iron oxide.

The substantially equivalent performance of a wide variety of non-reinforcing fillers is generally accepted in the organopolysiloxane art. For example, in U.S. Pat. No. 4,748,166, cited as equivalent fillers, either alone or in admixture, are ground quartz, diatomaceous earth, calcium carbonate, calcined clay, natural titanium dioxide (rutile), oxides of iron, zinc, chromium, zirconium, and magnesium, hydrated and non-hydrated alumina, boron nitride, lithopone, barium metaborate, powdered cork, wood sawdust, inorganic and organic fibers, and the like. Similar shopping lists of fillers may be found in U.S. Pat. Nos. 4,782,107 and 5,268,441, the latter of which discloses treatments suitable for rendering the fillers hydrophobic. Where heat resistance is required, it is generally acknowledged that iron oxide, zirconium oxide, and barium zirconate are good filler candidates. The use of red iron oxide in automotive RTV-2 gaskets is disclosed in U.S. Pat. No. 4,892,907. The most common non-reinforcing filler or extender is calcium carbonate, as disclosed in the Examples in U.S. Pat. Nos. 4,748,166; 4,962,151; 5,118,738; and 5,569,750.

Recently, under pressure to further increase fuel economy, fluids such as those used in axles, differentials, transmissions, and transaxles have come into scrutiny by automobile manufacturers. Use of viscous fluids in many of these applications results in a large energy loss. Moreover, since this energy loss appears in the form of heat, the lifetime of the various fluids is decreased. The current trend in such fluids is therefore to lower viscosity. For example, axle and gear lubricants have previously been typically composed of relatively viscous oily or greasy components such as heavy paraffin hydrotreated distillate, heavy paraffin solvent dewaxed distillate, and solvent dewaxed residual oil, but are now being replaced by lower viscosity lubricants containing numerous synthetic additives to increase the lubricity, necessary due to the lower film forming capacity of such lubricants, particularly at elevated temperature. Examples of these moderate to high pressure lubricant additives are olefin sulfides and organophosphate esters. Unfortunately, it has been found that the organopolysiloxane elastomers previously used with great success when exposed to conventional lubricants exhibited total failure in less than 200 hours operation in simulated use tests when exposed to more aggressive lubricants.

It would be desirable to provide gasketing and sealing materials which retain the superior thermal stability of silicone elastomers yet which can provide durability when exposed to aggressive fluids. It would be further desirable to provide RTV-1 compositions suitable for forming such gaskets and sealants.

SUMMARY OF THE INVENTION

It has now been surprisingly discovered that RTV-1 organopolysiloxane elastomer compositions comprising amine-cured organopolysiloxanes bearing silanol functionality, and including both iron oxide and magnesium oxide fillers, can be used to produce sealants whose physical properties, when exposed to aggressive functional fluids, are far greater than those of otherwise similar compositions containing iron oxide in combination with other fillers such as calcium carbonate. The RTV-1 compositions may be used for cast and pour-in-place gaskets and sealants as well as for other gasketing and traditional applications.

DESCRIPTION OF THE PREFERRED EMBODIMENTS

Figure 1:
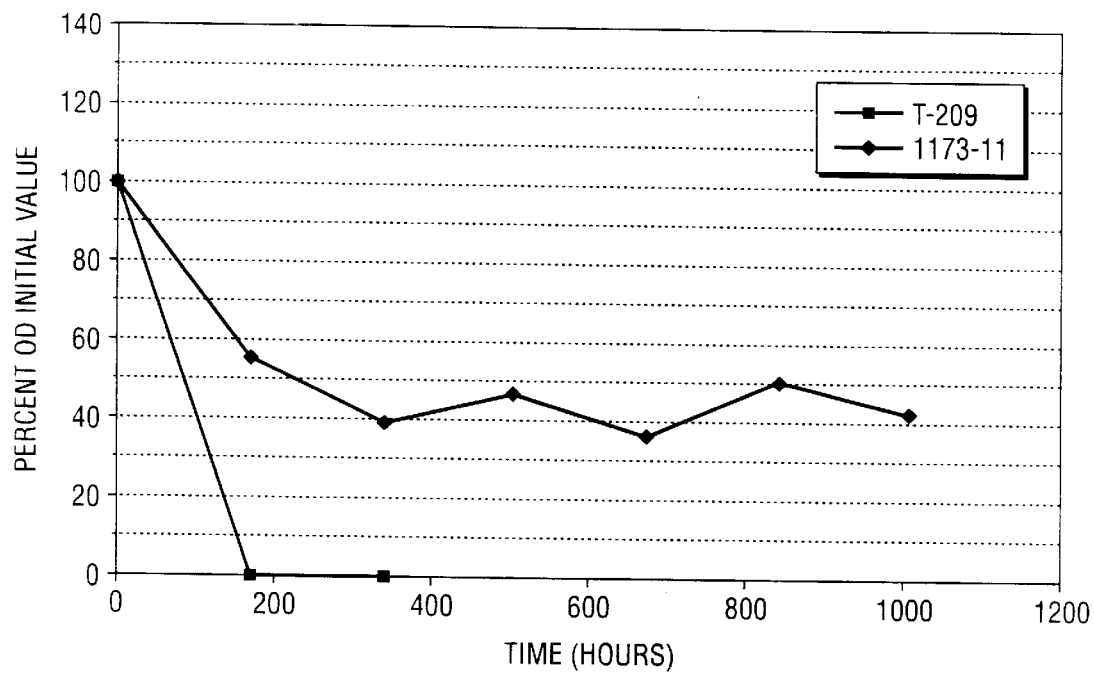
FIG. 1 is a plot of durometer hardness versus time for two RTV-1 sealants exposed to an aggressive axle lubricant.

The compositions of the present invention include, as necessary ingredients, (A) an organopolysiloxane component containing one or more silanol functional organosiloxanes; (B) an amine curing agent; (C) iron oxide; and (D) magnesium oxide. Other, optional ingredients include adhesion promoters, viscosifying and thixotropy additives, antioxidants, thermal stabilizers, and reinforcing fillers and non-reinforcing reinforcing fillers other than iron oxide and magnesium oxide. The compositions may also include reactive and non-reactive diluents and other organopolysiloxanes.

The silanol-functional organopolysiloxanes are predominantly composed of M and D units having the formulae:

$$R_a R^1_b R^2_c X_d SiO_{1/2} \text{ (M) and } R_a R^1_b R^2_c SiO_{2/2} \text{(D)},$$

and preferably those having the formulae:

$$R_a R^1_b SiO_{1/2} \text{ (M') and } R_a R^1_b SiO_{2/2} \text{ (D')},$$

where R is a $C_{1-18}$ substituted or unsubstituted alkyl, preferably a $C_{1-4}$ optionally substituted alkyl and more preferably a methyl group or a substituted or unsubstituted phenyl or naphthyl group; $R^1$ is a hydroxyl group; and $R^2$ is a substituted or unsubstituted alkynyl, alkenyl, or cycloalkenyl group, preferably a $C_{1-18}$ alkenyl group which is preferably co-unsaturated, both R and $R^2$ optionally containing interspersed groups

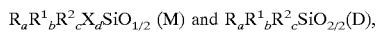

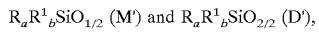

and the like, wherein in the (M) units, the sum of a+b+c=3 and in the (D) units, the sum of a+b+c is 2, wherein a, b, and c can be from 0 to 3. Preferably, few or no $R^2$ groups are present. $R^1$ is a silicon-bonded hydroxyl group, at least one of which must be present, on average, per molecule, and preferably 2 or more hydroxyl groups being present, on average, per molecule of the silanol-functional organopolysiloxane. The hydroxyl groups are preferably terminal, i.e. are located in M or M' units, but may be pendant hydroxyl groups as well. Suitable substituents for the R and $R^2$ groups include halogen, preferably chloro- and fluoro-radicals, cyano groups, alkoxy groups, hydroxyalkyleneoxy groups, and other substituents which are preferably non-reactive under storage conditions such that a stable RTV-1 formulation may be prepared.

X is a $C_{1-18}$ alkoxy group optionally containing interspersed hetero groups such as —O—, —S—, —NH— and the like, and d is 0, 1, or 2. Preferably, few or no alkoxy groups X are present in the silanol-functional organopolysiloxane.

The silanol-functional organopolysiloxanes can also contain T units corresponding to the formula $$R_a R^1_b R^2_c X_d SiO_{3/2} \text{ (T), and}$$

preferably $R_a R^1_b SiO_{3/2}$ (T'), and more preferably $R_a R^1_b X_d SiO_{3/2}$ (T") wherein R, $R^1$, $R^2$, and X, and a, b, c, and d are defined as before, but the sum of a, b, c, and d is 1, in other words only one of R, $R^1$, $R^2$ or X is present. The silanol-functional organopolysiloxanes may also contain $SiO_{4/2}$ (Q) units.

Preferably, the majority, in weight percent, of all silanol-functional organopolysiloxanes are substantially linear, being composed of (M) and (D) units and less than 10 mol percent T and Q units, preferably (M) and (D) units which are α,ω-silanol terminated. Used most preferably, due both to their lower cost and performance advantages, are α,ω-dihydroxypolydimethylsiloxanes having viscosities (25° C.) of from 100 to 1,000,000 mm²·s⁻¹, more preferably 2000 to 350,000 mm²·s⁻¹. Other examples of silanol-functional organopolysiloxanes may be found with reference to U.S. Pat. Nos. 4,748,166; 5,550,185; and 4,892,407.

In general, a single silanol-functional organopolysiloxane or a mixture of two or more silanol-functional organopolysiloxanes are useful.

In addition to the preferably substantially linear hydroxyl-terminated organopolysiloxanes, organopolysiloxane resins may be used. In the poly-siloxane art, resins are considered high molecular weight, highly crosslinked species which are often solids having but limited solubility in many solvents, and which contain relatively large numbers of (T) and/or (Q) units. Such resins are often soluble to some extent in liquid organopolysiloxanes and in solvents such as toluene and xylene. Preferably, such resins, when used, also bear silanol functional groups. Resins are preferably included as less than 40 weight percent of total organopolysiloxane, preferably less than 20 weight percent, and more preferably less than 10 weight percent. Most preferably, no resins or substantially no resins (<5 weight percent) are used.

Also useful as a portion of the organopolysiloxane component are non-functional organopolysiloxanes such as trimethylsilyl-terminated polydimethylsiloxanes and the like. Such organopolysiloxanes are useful in providing flexibility to the cured composition as well as serving to modify the viscosity of the curable formulations.

The organosiloxanes described previously may contain other groups which do not interfere with the storage stability of the RTV-1 compositions, and which do not interfere with the ability to cure. Non-limiting examples of such groups are pendant and terminal polyoxyalkylene groups, and intrachain alkylene and polyoxyalkylene groups, for example silicon atoms linked by an interspersed alkylene group of 1 to 18 carbon atoms, an alkylenedioxy radical, e.g. —O—$(CH_2)_n$O—, or a polyoxyalkylene radical. Preferably, however, the organosilicon compounds used herein in component (A) are organopolysiloxanes wherein the organic silicon-bonded substituents are predominantly methyl groups.

The amine curing (crosslinking) agent (B) can be any amine which is effective to promote cure of the subject compositions upon exposure to moisture. Suitable amine curing agents are well known to the art, and in general are aliphatic or cycloaliphatic aminosilanes.

Examples of curing agents (B) are amine substituted organosilicon compounds of the formula $R^3{}_zSi(NY_2)_{4-z}$ or amino-silazanes of the formula:

wherein each $R^3$ is a $C_{1-22}$ alkyl radical, $C_{6-30}$ aryl radical, $C_{7-30}$ aralkyl radical or alkaryl radical, each Y is a hydrogen atom, $C_{1-22}$ alkyl radical, $C_{6-30}$ aryl radical, $C_{4-12}$ cycloalkyl radical, $C_{7-30}$ alkaryl radical or $C_{7-30}$ aralkyl radical, d is 2 or 3, e is 0 or 1, f is 1 or 2, g is at least 1 and z is 0 or 1.

Preferred aminosilanes contain 3 or 4 amino substituents per Si atom and 0 or 1 alkyl radical, aryl radical, alkaryl radical or aralkyl radical per Si atom. Thus, tri- or tetrafunctional silanes are preferred. Tetrafunctional silanes are generally more reactive than tri- or difunctional, and hence will bring about a more rapid vulcanization (cure) than can be obtained with trifunctional silanes. In general, the aminosilanes may be represented by the formula $R^3Si(NY_2)_3$ and $Si(NY_2)_4$, where $R^3$ is an alkyl radical, preferably a $C_{1-18}$ alkyl radical or cycloalkyl radical such as methyl, ethyl, propyl, cyclopentyl, cyclohexyl, or octadecyl; an aryl radical such as phenyl, naphthyl, or anthracyl; an aralkyl radical such as benzyl or phenylethyl; or an alkaryl radical such as the tolyl or xylyl radicals, and each Y is H, or an alkyl, aryl, cycloalkyl, alkaryl or aralkyl radical as defined for $R^3$. Mixtures of these aminosilanes can also be employed.

The aminosilanes may be prepared by known methods, such as reacting a silane containing hydrogen, a halogen, or an alkoxy substituent with a primary or secondary amine. Suitable silane reactants include $SiCl_4$, $Si(OC_2H_5)_4$, $CH_3SiCl_3$, $CH_3Si(OC_3H_7)_3$, $C_6H_5Si(OCH_3)_3$, $C_6H_5SiCl_3$ and $C_6H_5SiH_3$. Suitable amine reactants include aliphatic, cycloaliphatic, aromatic and araliphatic primary and secondary amines as well as ammonia. Preferred amines include monobutyl amine, diethyl amine, aniline and N-methylaniline.

The aminosilazanes which may be employed are prepared by known methods and are materials disclosed and discussed in the art.

Other amino substituted organosilicon compounds which may be employed are those obtained from the reaction of a halosilane and a monocycloalkylamine. The silane reactant may be illustrated by the formula $R^3SiX_3$ where $R^3$ is the same as above. The halogen atoms represented by X can be fluorine, chlorine, bromine or iodine.

Low Molecular weight siloxanes having at least three chlorine atoms per molecule bonded to silicon can be employed in the reaction with the cycloalkylamine. The organohalogensilane or siloxane is reacted with any monocycloalkylamine, preferably monocycloalkylamines having from 5 to 12 carbon atoms such as cyclopentylamine, cyclohexylamine, cycloheptylamine, 3,5,5-trimethylcyclohexylamine and 2,3,4-triethylcyclohexylamine. Cyclohexylamine is the preferred cycloalkylamine. The reactants can include mixtures of various silanes and various cycloalkylamines, hence the reaction is between at least one silane and at least one cycloalkylamine. Most preferred are tris(aminoalkyl)silanes such as methyl-tris(sec-butylamino)silane, methyl-tris(n-butylamino)silane, and particularly methyl-tris(cyclohexylamino)silane, in each case, the amino nitrogens being bonded directly to Si.

The reaction of the silane and the cycloalkylamine is carried forward in accordance with known procedures for reacting halosilanes with primary amines. Such procedures are described, for example, in U.S. Pat. Nos. 2,564,674, 2,579,417 and 2,579,418.

The reaction of the silane with the monocycloalkylamine to produce the desired silamines is best carried out in the substantial absence of water and in a solvent system. The solvent employed should, of course, be inert to the reactants. Examples of suitable solvents are toluene and methylene chloride. After the reaction has been completed as indicated by the cessation of precipitation of amine salts, the reaction product is separated from amine salts by filtration or other means as desired. The solvent is removed from the reaction product preferably by distillation under reduced pressure to avoid or minimize the decomposition of the reaction product. The residue obtained is suitable for use as the amine substituted organosilicon compound.

The amine substituted organosilicon compounds are stored under essentially anhydrous conditions and are added to the siloxane polymer under essentially anhydrous conditions. These amine substituted organosilicon compounds are employed in amounts which preferably will provide at least one gram equivalent silicon atom of the amine substituted organosilicon compound per gram equivalent of reactive end groups on the diorganopolysiloxane. Generally from 0.2 to 15 parts by weight of amine substituted organosilicon compound is added for each 100 parts by weight of the hydroxyl terminated organopolysiloxane polymer. The order of addition of the various ingredients is optional, but the mixture should be prepared in an atmosphere substantially free of water.

In addition to the siloxane polymer and amine substituted organosilicon compound, the composition can contain additives such as compression-set additives, pigments, soluble dyes, aromatics (essential oils), oxidation inhibitors, heat stabilizers, flame retardants and light stabilizers, plasticizers and softeners such as trimethylsiloxy endblocked dimethylpolysiloxane fluids, reinforcing fillers and non-reinforcing fillers. Condensation catalysts such as disclosed in U.S. Pat. Nos. 2,843,555, 3,127,363, 3,082,527 and others, can be employed.

Iron oxide is a necessary ingredient of the subject compositions, and must be present in amounts of from about 5% to about 50% by weight relative to the total weight of the composition, preferably 15% to 40% by weight. All types of finely ground or small particle size iron oxide is suitable. Mean particle size should preferably exceed 0.05 μm and normally will be in the range of 0.1 μm to less than 10 μm. Black iron oxide, yellow iron oxide, and red iron oxide, and other pigment grade iron oxides are among those suitable. A preferred iron oxide is available from Harcross Pigments, Inc., as RY 2096 red iron oxide. Without the iron oxide component or a transition metal oxide or other equivalent, the thermal stability of the sealants will not be suitable.

Magnesium oxide is a necessary ingredient, and should be present in amounts of from about 2% to about 50% by weight, preferably 4% to 40% by weight, and most preferably, from about 6% to about 20% by weight. The magnesium oxide may have the same particle size range as the iron oxide. A suitable magnesium oxide is Magox 98 HR STI available from Premier Services Corp.

Other fillers are optional ingredients. Fillers such as ground quartz, fumed silica, diatomaceous earth, clay minerals, ground felspar, ground limestone and precipitated and other forms of calcium carbonate, magnesium silicate, calcium silicate, and other inorganic fillers are acceptable. In general, organic fillers are to be avoided. Most preferred as an auxiliary filler is calcium carbonate available from Zeneca Resins as Winnofil® SPM.

The iron oxide, magnesium oxide, and auxiliary fillers may be hydrophilic or hydrophobic. Hydrophobic fillers are prepared by treatment with organosilanes by processes which by now are well known, or by treating with wax or waxy compounds such as long chain fatty acids. For example, the preferred calcium carbonate filler is a stearated calcium carbonate.

Adhesion promoters may be useful in the subject compositions in limited quantities. Adhesion promoted generally provide both silicon-bonded alkoxy groups as well as amino groups. Examples of adhesion promoters include γ-aminopropyltriethoxysilane and like compounds, and other reactive silanes known to the art. Also suitable are metalophilic compounds which are soluble or dispersible in the subject compositions. By "metalophilic" is meant a compound which improves the adhesion of the subject compositions to metals. A preferred adhesion promoter is KS-1 available from Wacker-Chemie, which is an oxypropylated and oxyethylated ethylenediamine. Other adhesion promoters include N,N,N',N'-tetrakis[2-hydroxyalkyl] alkylenediamines and their oxyethylates, oxypropylates, and other oxyalkylated species. Compounds such as diethanolamine, dipropanolamine, and their oxyalkylated analogs are also suitable, as are various morpholino-functional compounds. While adhesion promoters such as the various aminoalkylalkoxysilanes such as γ-aminopropyltrimethoxysilane are useful, the total silicon-bonded alkoxy group content must generally be less than 5% by weight in the total composition, preferably less than 3% by weight, and most preferably less than 1% by weight. Compositions containing excess silicon-bonded alkoxy groups may not exhibit desirable deep section cure.

Other additives and auxiliaries may be optionally added. These include additives such as solvents, surfactants, and thixotropes which may be useful to modify the compositions' viscosities or viscosity-shear relationships or other properties; pigments (other than iron oxide filler) such as carbon black, manganese dioxide, phthalocyanines, and the like; catalysts such as the various tin compounds, especially organotin compounds such as dibutyltindiacetate, dibutyltindilaurate, diethyltindiacetate, tin octoate, and titanium complexes, particularly the titanium-based condensation catalysts disclosed in U.S. Pat. No. 5,268,441; and ketoximes and aminohydrocarbyl ketoximes which may function as catalysts, crosslinkers, and/or adhesion promoters such as those disclosed in U.S. Pat. Nos. 5,569,750 and 5,013,781.

In the compositions of the subject invention, the organopolysiloxane component (A) generally comprises from about 10% to about 90% by weight of the total sealant, preferably about 15% to about 85% by weight, more preferably about 20% to about 50% by weight, and most preferably about 20% to 45% by weight. Of the total organopolysiloxane in component (A), it is preferable that silanol-functional organosilicon compounds comprise the major part of the (A) component, preferably about 60 weight percent or more, and most preferably about 70–90 weight percent. Of the non-silanol-functional organopolysiloxane, it is preferable that trimethylsilyl or other non-functionally end-blocked polydimethylsiloxane be used.

The crosslinking agent (B) is used in an effective amount such that cure can be obtained, preferably in amounts of from about 0.2 percent to about 15 percent by weight, more preferably about 3 to about 10 percent by weight, and most preferably about 4 to about 8 percent by weight.

The percentages by weight of iron oxide and magnesium oxide have been previously given. Auxiliary filler is preferably used in amounts of 15% to 50% by weight, preferably 20% to 40% by weight, and more preferably 25% to 30% by weight. The total weight of filler, including iron oxide, magnesium oxide, and auxiliary fillers, can range from about 5% by weight to about 70% by weight, more preferably 15% to about 65% by weight, and most preferably 25% to about 55% by weight. The total filler content is generally higher when considerable amounts of auxiliary fillers are used.

The order of mixing the ingredients is not overly critical. Generally, the organopolysiloxane components are added and homogenized in a mixer or blender, followed by addition of filler. Crosslinking agents, adhesion promoters, etc., are generally added last. The mixing operation typically takes place in vacuuo or under a dry nitrogen blanket so as to exclude moisture.

Having generally described this invention, a further understanding can be obtained by reference to certain specific examples which are provided herein for purposes of illustration only and are not intended to be limiting unless otherwise specified.

COMPARISON EXAMPLE 1

Sealant compositions are prepared, one formulation of which is consistent with prior art practice for sealants useful in axles when exposed to conventional axle lubricants (Comparison Example C1), and a sealant formulation in accordance with the present invention. The sealants are RTV-1 compositions prepared by mixing the ingredients listed in Table 1 until homogenous, with the exclusion of water.

TABLE 1

| Component | Function | Comparison Example C1 | Example 1 |
|---|---|---|---|
| Elastomer 20N[1] | Silanol-functional Polysiloxane | 29.07 | 29.14 |
| PDMS | Viscosity Adjustment/Diluent | 9.67[2] | 9.70[3] |
| CA 40[4] | Crosslinker | 6.77 | 6.78 |
| Silane GF91[5] | Adhesion Promoter | 0.08 | 0.08 |
| KS 1[6] | Adhesion Promoter | 1.05 | 1.05 |
| RY 2096 | Red Iron Oxide | 17.54 | 17.58 |
| Magox ® 98 HR STI | Magnesium Oxide | 0 | 8.04 |
| Winnofil ® SPM[7] | Filler | 35.83 | 27.63 |

[1]α,ω-dihydroxypolydimethylsiloxane, 20,000 cSt.
[2]100 cSt trimethylsilyl-terminated polydimethylsiloxane fluid
[3]10,000 cSt trimethylsilyl-terminated polydimethylsiloxane fluid
[4]Methyl-tris[aminocyclohexyl]silane
[5]N-[3-trimethoxysilylpropyl]-1,2-ethanediamine
[6]Polyoxyalkylated ethylenediamine
[7]Stearated calcium carbonate The compositions were placed in sealed containers until use.

Sheets having a nominal thickness of 0.080" were cast from each of the compositions and allowed to cure at room temperature and ca. 50% relative humidity for 7 days. Specimens were cast for testing hardness (Durometer, Shore A) (ASTM-D2240), tensile strength (ASTM-D412), and elongation (ASTM-D412). In addition, a portion of each sealant was applied between the edges of overlapping metal sheets to measure lap shear strength (ASTM-D1002). The specimens from the Comparative Sealant and the inventive sealant were immersed in an aggressive axle lubricant, Texaco® 2224 lubricant, maintained at 150° C. Specimens were periodically removed and tested.

Figure 2:
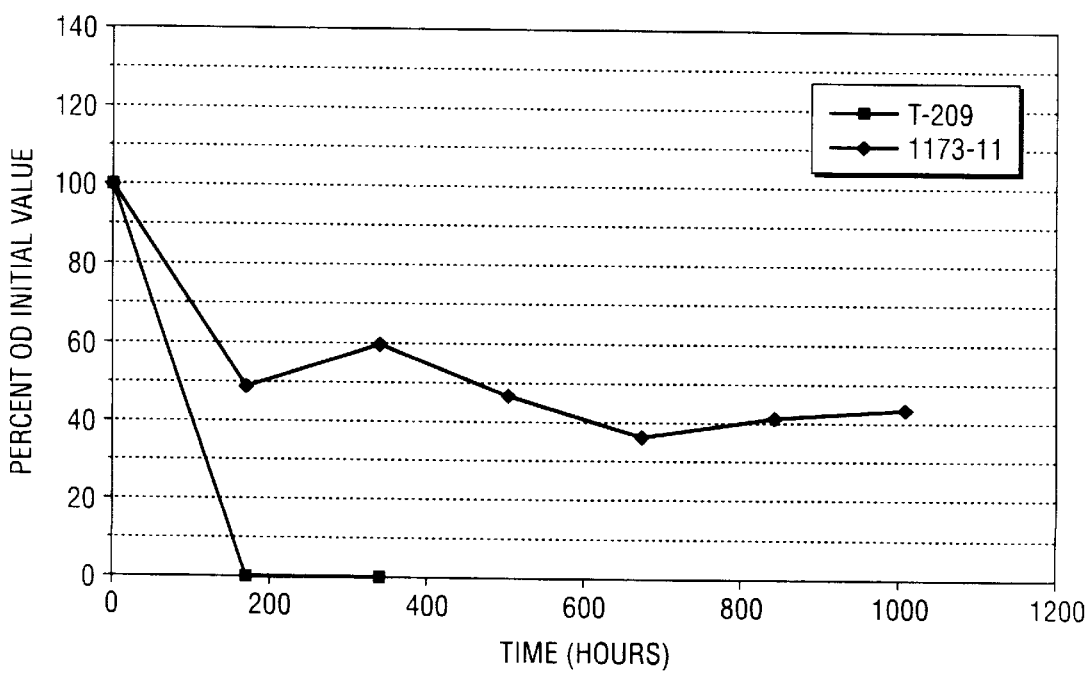
FIG. 2 is a plot of tensile strength versus time for two RTV-1 sealants exposed to an aggressive axle lubricant.
Figure 3:
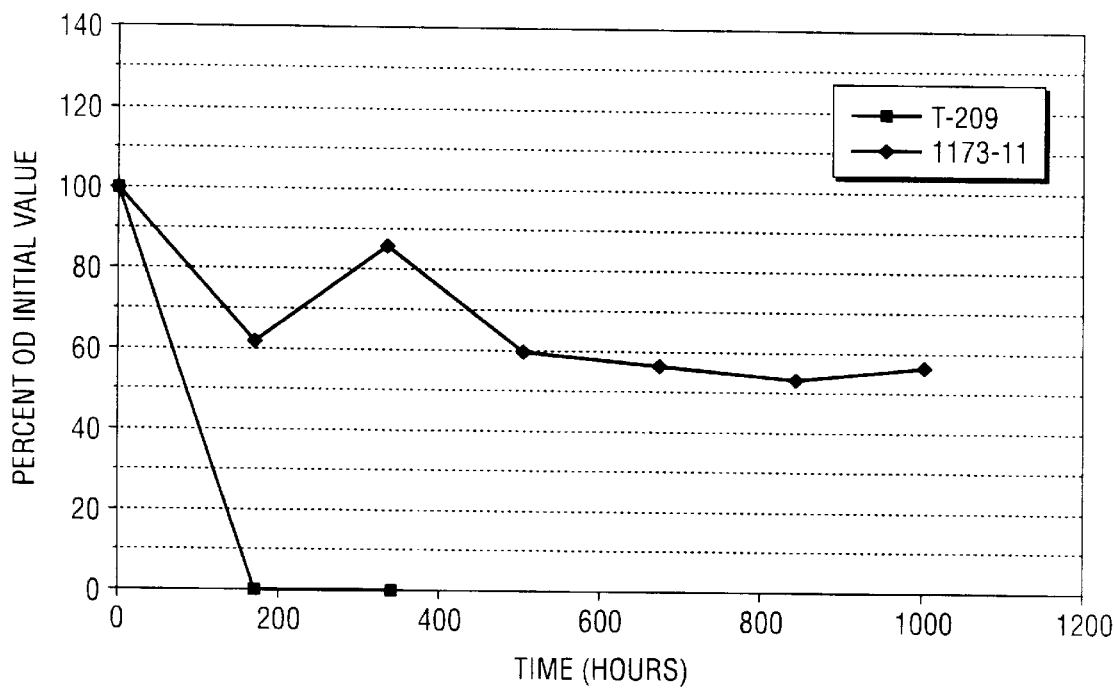
FIG. 3 is a plot of elongation versus time for two RTV-1 sealants exposed to an aggressive axle lubricant.

Hardness (Durometer) is illustrated in FIG. 1. As noted, the hardness of the sealant rapidly decreased. At approximately 170–180 hours of exposure, the Comparison Example C1 elastomers had essentially dissolved and/or disintegrated. Tensile strength (FIG. 2) and Elongation (FIG. 3) all showed similar results. The more aggressive lubricant destroyed the Comparison Sealant. On the other hand, the inventive sealant, in which about 25% of the calcium carbonate filler has been replaced by magnesium oxide, showed an initial loss in properties which then substantially plateaued in the range of 200–400 hours of immersion. From that point on, no substantial decrease in properties was observed.

Figure 4:
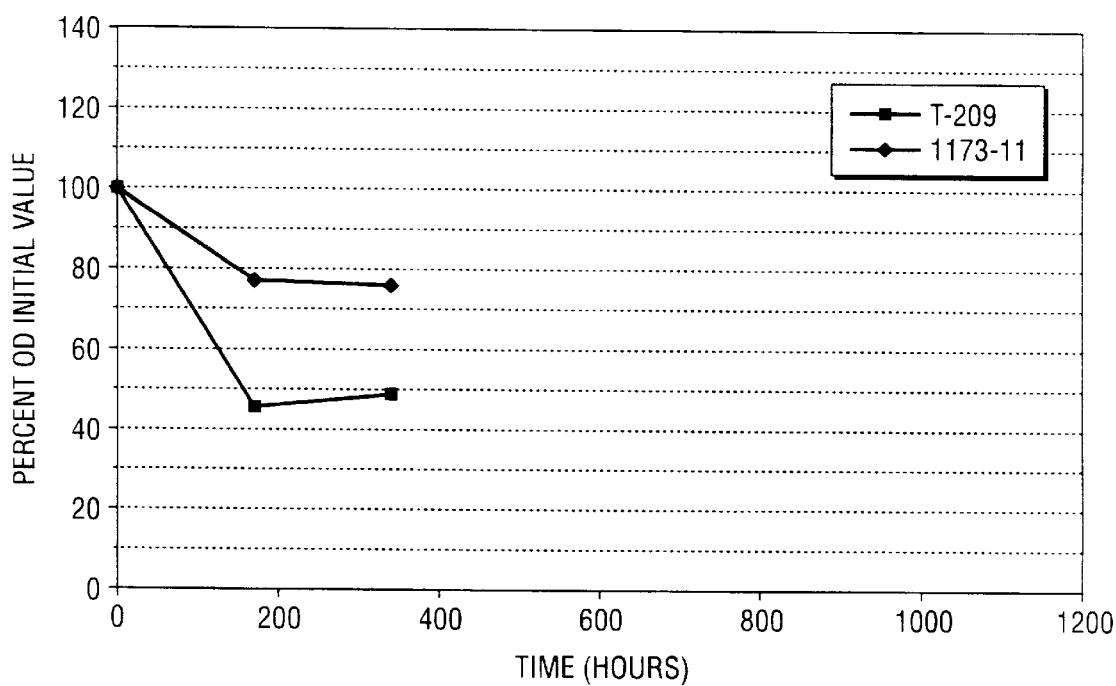
FIG. 4 is a plot of lap shear strength versus time for two RTV-1 sealants exposed to an aggressive axle lubricant.

The lap shear test (FIG. 4) shows that the Comparison Sealant lost about 50% of its lap shear strength by 200 hours, while the inventive sealant lost only about 20–25% of its lap shear strength over the same interval.

Having now fully described the invention, it will be apparent to one of ordinary skill in the art that many changes and modifications can be made thereto without departing from the spirit or scope of the invention as set forth herein.

By the term "resistant to aggressive functional fluids" is meant that the physical properties of the cured sealant exceed those of a similar sealant prepared from the same ingredients but containing no magnesium oxide when exposed to Texaco® 2224 lubricant or a similar aggressive lubricant or in side-by-side tests with a particular functional fluid. The term "major", when used, means 50% or more by weight or by mole when so indicated, while "minor" means less than 50% on the same basis. The claimed compositions must include the necessary ingredients silanol-functional organopolysiloxane, amine curing agent, iron oxide, and magnesium oxide, but may exclude any ingredient identified herein as optional, any may further exclude any ingredient not identified herein.

What is claimed is:

1. In a process for sealing components exposed to aggressive functional fluids with an RTV-1 silicone sealant, the improvement comprising:

selecting as said sealant an aggressive functional fluid-resistant sealant, said sealant prepared by curing a sealant composition prepared from components comprising:

(A) from about 10 percent to about 90 percent of an organopolysiloxane component comprising, in major part, one or more silanol-functional organopolysiloxanes;

(B) an amount of an amino-functional crosslinker effective to cure said sealant composition in the presence of moisture;

(C) from about 5 percent to about 50 percent iron oxide; and (D) from about 2 to about 50 percent magnesium oxide, wherein all percents herein are percents by weight relative to total sealant composition weight unless otherwise specified.

2. The process of claim 1 wherein said amino-functional crosslinker is present in an amount of from about 0.2 percent to about 15 percent by weight based on component (A).

3. The process of claim 1 wherein said one or more silanol-functional organopolysiloxanes comprise 60 parts or more per 100 parts of organopolysiloxane component (A); wherein said organopolysiloxane component (A) comprises from 20 to about 50 percent of said sealant composition; and wherein said magnesium oxide is present in an amount of from 4% to about 40 percent of said sealant composition.

4. The process of claim 1, wherein said sealant composition further comprises an adhesion promoter.

5. The process of claim 1, wherein said sealant composition comprises:

(A) from about 20 to about 50 percent of an organopolysiloxane component comprising,
      a)i) in major part, one or more silanol-functional siloxanes containing moieties having the formulae:

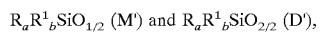

wherein each R individually is a monovalent $C_{1-18}$ substituted or unsubstituted saturated hydrocarbon radical optionally containing interspersed

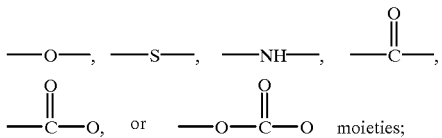

wherein $R^1$ is hydroxy; and where a is 0, 1, 2, or 3 and b is 0 or 1, with the proviso that in M' a+b=3 and in D', a+b=2, and wherein said silanol functional organopolysiloxane contains at least one $R^1$;

(B) from about 2 percent to about 15 percent of an aminosilane or aminosilazane crosslinker containing the Si—N bonded residue(s) of one or more primary or secondary aliphatic or cycloaliphatic amino groups;

(C) from about 15 percent to about 40 percent iron oxide; and (D) from about 4 to about 40 percent magnesium oxide.

6. The process of claim 5 wherein said organopolysiloxane component further comprises one or more trimethylsilyl-capped polydimethylsiloxanes.

7. The process of claim 5 wherein said sealant composition further comprises an effective amount of an adhesion promoter.

8. The process of claim 1, wherein said crosslinker (B) comprises:

B)i) $R^3_z Si(NY_2)_{4-z}$,
   B)ii) $(Y_2N)_d R^3 SiNH(R^3_e(Y_2N)_f SiNH)_g SiR^3_e(NY_2)_d$,
   B)iii) siloxanes or polysiloxanes having bonded thereto one or more $(NY_2)_d Si$-moieites wherein d is 1, 2, or 3, or
   B)iv) mixtures thereof, wherein each $R^3$ is a $C_{1-22}$ alkyl radical, $C_{6-30}$ aryl radical, $C_{7-30}$ aralkyl radical or alkaryl radical, each Y is a hydrogen atom, $C_{1-22}$ alkyl radical, $C_{6-30}$ aryl radical, $C_{4-12}$ cycloalkyl radical, $C_{7-30}$ alkaryl radical or $C_{7-30}$ aralkyl radical, d is 2 or 3, e is 0 or 1, f is 1 or 2, g is at least 1 and z is 0 or 1.

9. A RTV-1 organopolysiloxane seal resistant to aggressive functional fluids, said seal prepared by curing a sealant composition comprising:

(A) from about 10 percent to about 90 percent of an organopolysiloxane component comprising, in major part, one or more silanol-functional organopolysiloxanes;

(B) an amount of an amino-functional crosslinker effective to cure said sealant composition in the presence of moisture;

(C) from about 5 percent to about 50 percent iron oxide; and (D) from about 2 to about 50 percent magnesium oxide.

10. The seal of claim 9 wherein said amino-functional crosslinker is present in an amount of from about 0.2 percent to about 15 percent by weight based on component (A).

11. The seal of claim 9 wherein said one or more silanol-functional organopolysiloxanes comprise 60 parts or more per 100 parts of organopolysiloxane component (A); wherein said organopolysiloxane component (A) comprises from 20 to about 50 percent of said sealant composition; and wherein said magnesium oxide is present in an amount of from 4 percent to about 40 percent of said sealant composition.

12. The seal of claim 9, wherein said sealant composition further comprises an adhesion promoter.

13. The seal of claim 9, wherein said sealant composition comprises:
(A) from about 20 to about 50 percent of an organopolysiloxane component comprising,
a)i) in major part, one or more silanol-functional siloxanes containing moieties having the formulae:

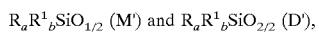
$R_aR^1_bSiO_{1/2}$ (M') and $R_aR^1_bSiO_{2/2}$ (D'), wherein each R individually is a monovalent $C_{1-18}$ substituted or unsubstituted saturated hydrocarbon radical optionally containing interspersed

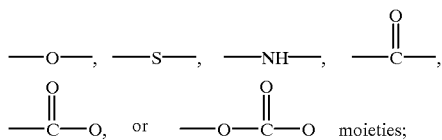

wherein $R^1$ is hydroxy; and where a is 0, 1, 2, or 3 and b is 0 or 1, with the proviso that in M' a+b=3 and in D', a+b=2, and wherein said silanol functional organopolysiloxane contains at least one $R^1$;
(B) from about 2 percent to about 15 percent of an aminosilane or aminosilazane crosslinker containing the Si—N bonded residues of one or more primary or secondary aliphatic or cycloaliphatic amino groups;
(C) from about 15 percent to about 40 percent iron oxide; and
(D) from about 4 to about 40 percent magnesium oxide.

14. The seal of claim 13, wherein said organopolysiloxane component further comprises one or more trimethylsilyl capped polydimethylsiloxanes.

15. The seal of claim 13, wherein said sealant composition further comprises an effective amount of an adhesion promoter.

16. The seal of claim 13, wherein said amine crosslinker comprises an aminoalkyl-functional silane.

17. The seal of claim 14, wherein said crosslinker comprises a poly functional silane.

18. The seal of claim 17, wherein said crosslinker (B) comprises:
B)i) $R^3_3Si(NY_2)_{4-z}$,
B)ii) $(Y_2N)_dR^3SiNH$ $(R^3_e(Y_2N)_fSiNH)_gSiR^3_e(NY_2)_d$,
B)iii) siloxanes or polysiloxanes having bonded thereto one or more $(NY_2)_dSi$-moieites wherein d is 1, 2, or 3, or
B)iv) mixtures thereof,
wherein each $R^3$ is a $C_{1-22}$ alkyl radical, $C_{6-30}$ aryl radical, $C_{7-30}$ aralkyl radical or alkaryl radical, each Y is a hydrogen atom, $C_{1-22}$ alkyl radical, $C_{6-30}$ aryl radical, $C_{4-12}$ cycloalkyl radical, $C_{7-30}$ alkaryl radical or $C_{7-30}$ aralkyl radical, d is 2 or 3, e is 0 or 1, f is 1 or 2, g is at least 1 and z is 0 or 1.

19. The seal of claim 13, wherein said organopolysiloxane component (A) further comprises one or more moieties corresponding to the formula:

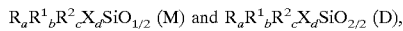
$R_aR^1_bR^2_cX_dSiO_{1/2}$ (M) and $R_aR^1_bR^2_cX_dSiO_{2/2}$ (D), where R, $R^1$, a, and b have the same meanings as in claim 13; wherein $R^2$ is a $C_{1-18}$ unsaturated alkynyl, alkenyl or cycloalkenyl group optionally containing heteroatoms of O, S, and N; wherein c is 1, 2, or 3; wherein X is $C_{1-18}$ alkoxy, optionally interspersed with —O—; and wherein d is 0, 1, 2, or 3, with the proviso that in (M), a+b+c+d=3, and in (D), a+b+c+d=2.

20. The seal of claim 13, wherein said organopolysiloxane component (A) or an optional adhesion promoter or both also contain silicon-bonded $C_{1-18}$ alkoxy groups.

21. The seal of claim 13, wherein said organopolysiloxane component (A) further comprises an organopolysiloxane resin.

22. The seal of claim 13, further comprising from about 20 percent to about 40 percent of an auxiliary filler.

23. The process of claim 1, wherein said sealant composition further comprises from 15 percent to 50 percent calcium carbonate filler.

24. In a process for sealing components with an RTV-1 silicone sealant, the improvement comprising:
selecting as said sealant an aggressive functional fluid-resistant sealant, said sealant prepared by curing a sealant composition prepared from components comprising:
(A) from about 10 percent to about 90 percent of an organopolysiloxane component comprising, in major part, one or more silanol-functional organopolysiloxanes;
(B) an amount of an amino-functional crosslinker effective to cure said sealant composition in the presence of moisture;
(C) a filler component in an amount of 7 percent to 70 percent, said filler component consisting essentially of:
c)i) 5 percent to 50 percent iron oxide;
c)ii) 2 to 50 percent magnesium oxide; and
c)iii) optionally further fillers selected from the group consisting of ground quartz, fumed silica, diatomaceous earth, clay minerals, ground felspar, calcium carbonate, magnesium silicate, calcium silicate, and mixtures thereof; wherein the amounts of c)i), c)ii) and c)iii) are based upon the total weight of the composition.

25. A curable RTV-1 organopolysiloxane sealant composition resistant to aggressive functional fluids, said sealant composition comprising:
(A) from about 10 percent to about 90 percent of an organopolysiloxane component comprising, in major part, one or more silanol-functional organopolysiloxanes;
(B) an amount of an amino-functional crosslinker effective to cure said sealant composition in the presence of moisture;
(C) a filler component in an amount of 7 percent to 70 percent, said filler component consisting essentially of:
c)i) 5 percent to 50 percent iron oxide;
c)ii) 2 to 50 percent magnesium oxide; and
c)iii) optionally further fillers selected from the group consisting of ground quartz, fumed silica, diatomaceous earth, clay minerals, ground felspar, calcium carbonate, magnesium silicate, calcium silicate, and mixtures thereof; wherein the amounts of c)i), c)ii) and c)iii) are based upon the total weight of the composition.

* * * * *

UNITED STATES PATENT AND TRADEMARK OFFICE
CERTIFICATE OF CORRECTION

PATENT NO : 6,103,804
DATED : August 15, 2000
INVENTOR(S) : TIMOTHY D. DAVIS

It is certified that error appears in the above-identified patent and that said Letters Patent are hereby corrected as shown below:

Column 11, Line 52, Claim 18: B(i) should read:

-- $R^3_z Si(NY_2)_{4-z}$ --.

Signed and Sealed this

Twenty-fourth Day of April, 2001

Attest:

NICHOLAS P. GODICI

Attesting Officer    Acting Director of the United States Patent and Trademark Office